Nov. 3, 1936.   H. W. RUPPLE   2,059,710
AUTOMATIC METALWORKING MACHINE
Filed May 26, 1934    3 Sheets-Sheet 1
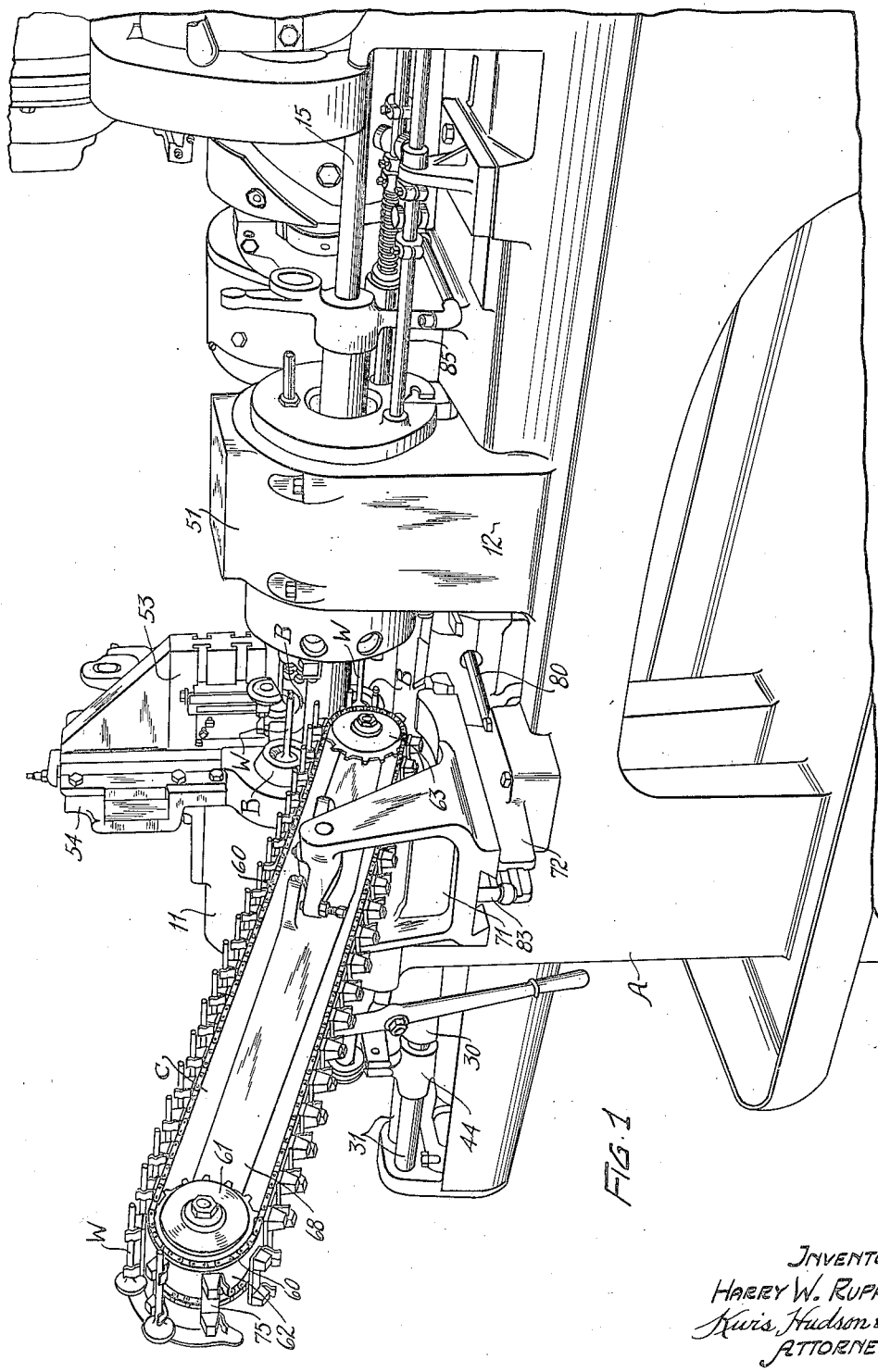
INVENTOR
HARRY W. RUPPLE
Kwis, Hudson & Kent
ATTORNEYS Nov. 3, 1936.  H. W. RUPPLE  2,059,710
AUTOMATIC METALWORKING MACHINE
Filed May 26, 1934    3 Sheets—Sheet 2
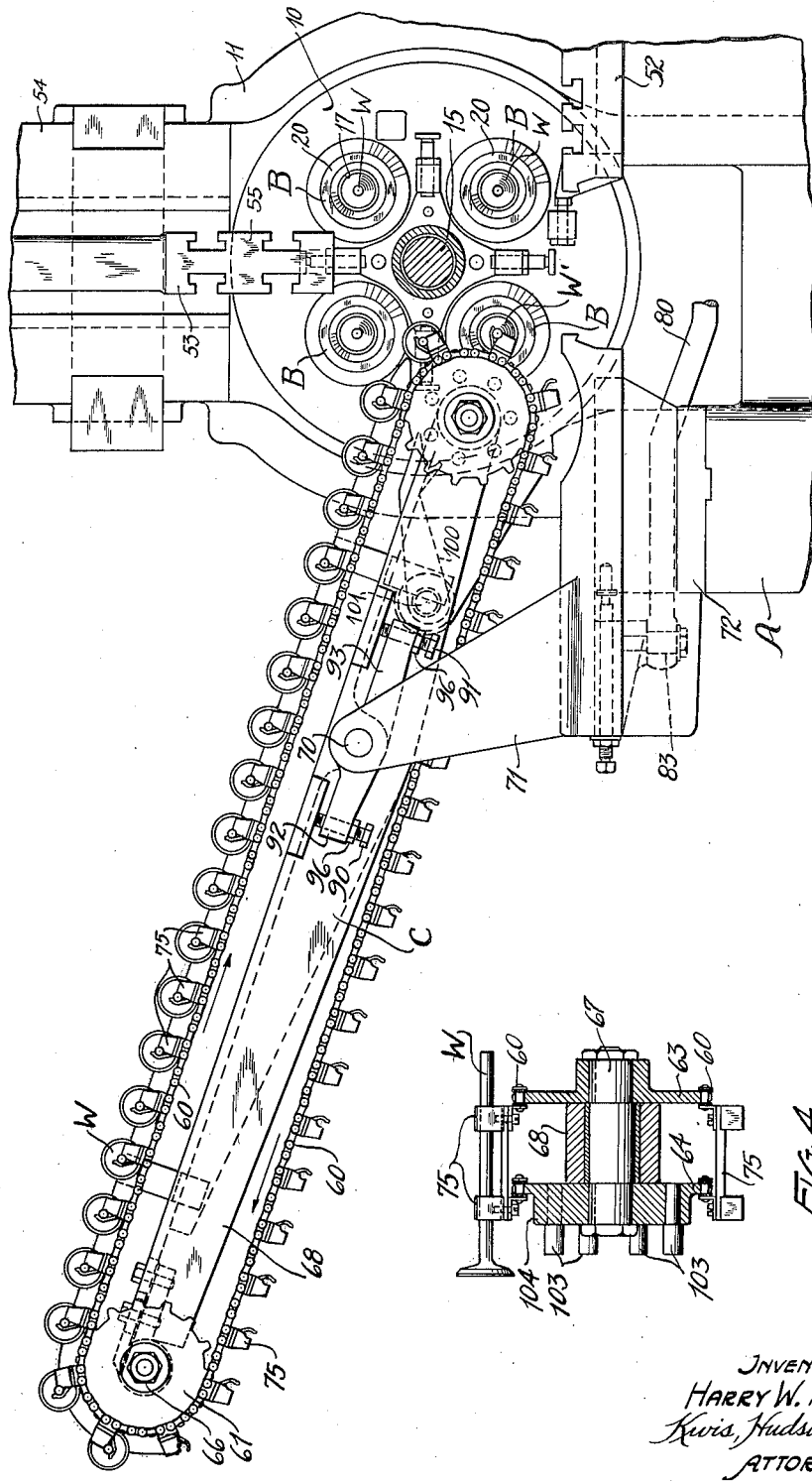
INVENTOR
HARRY W. RUPPLE
Kwis, Hudson + Kent
ATTORNEYS

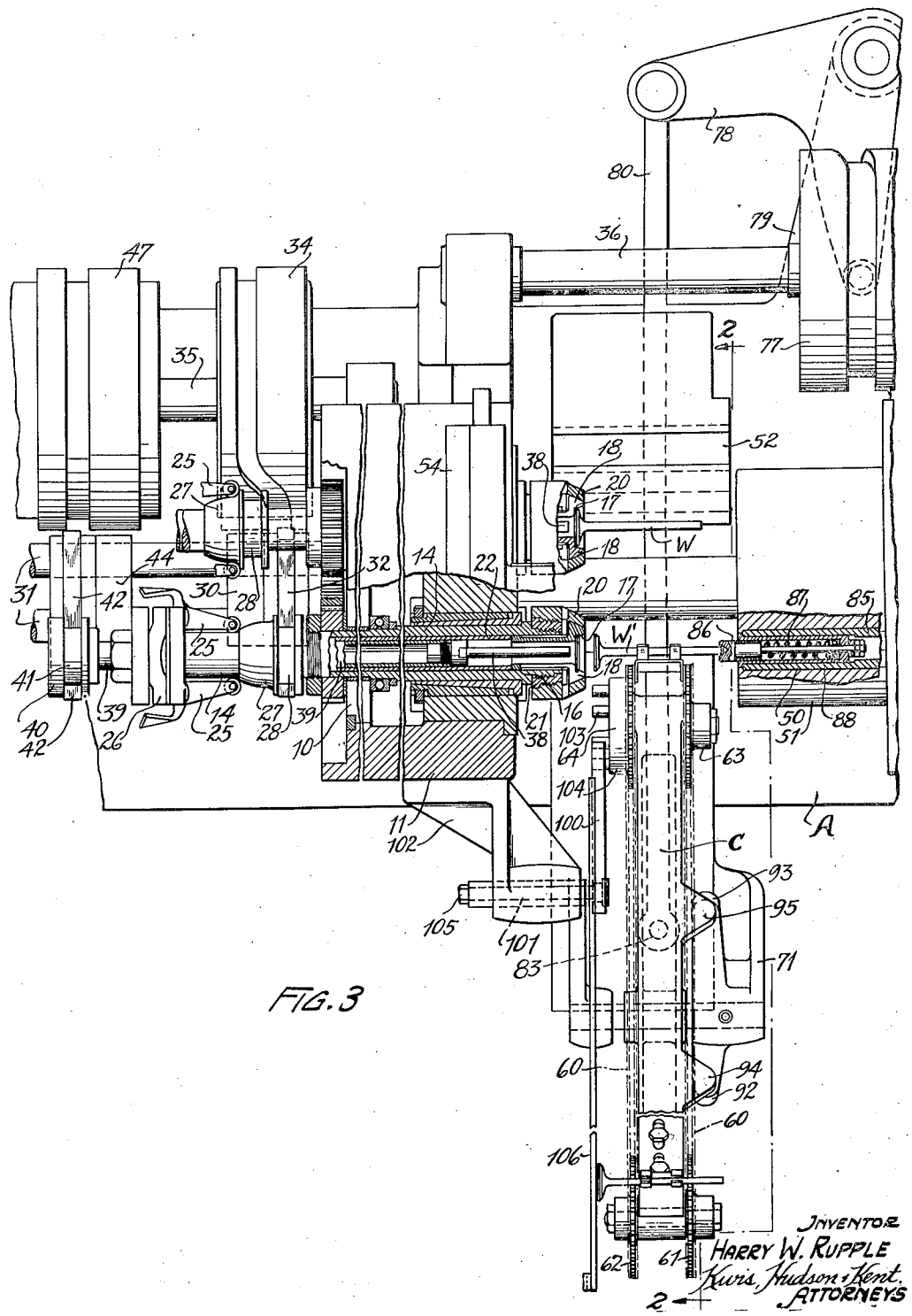

Patented Nov. 3, 1936

2,059,710

UNITED STATES PATENT OFFICE 2,059,710

AUTOMATIC METALWORKING MACHINE

Harry W. Rupple, Shaker Heights, Ohio, assignor to The Cleveland Automatic Machine Company, Cleveland, Ohio, a corporation of Ohio Application May 26, 1934, Serial No. 727,761

10 Claims. (Cl. 29—60)

The present invention relates to automatic metal working machine tools, and particularly to mechanical feeding or chucking mechanism for either single or multiple spindle, position or indexable spindle turret type of chucking machines.

Machines of the general character referred to comprise one or a plurality of spindles, provided with work holding chucks at the front end thereof, rotatably supported in the machine frame or in the case of an indexable spindle turret type of machine, in an indexable turret. In the latter type of machine the turret is periodically indexed to carry the spindles successively through a plurality of tool stations to perform desired operations on work blanks supported in the spindle chucks. In either type of machine the tools are usually carried by a main tool slide, cross slides and/or head slides, depending upon the particular construction of machine and the operations to be performed on the work blanks. The work blanks are removed from and inserted in the chuck or chucks, an operation usually referred to as chucking, at predetermined intervals. In the indexable spindle turret type of machine the chucking operation is performed at one of the stations, as the spindles are successively indexed therethrough, commonly referred to as the chucking or loading station from which station the tools are usually omitted.

An object of the present invention is the provision of a novel automatic mechanical feeding or chucking mechanism for supplying blanks to the work spindle or spindles of a single or multiple spindle chucking machine of the character referred to.

Another object of the invention is the provision of a novel automatic feeding or chucking mechanism for supplying blanks to the work spindles of a multiple spindle indexable turret type of chucking machine at the loading station, which comprises a link conveyor adapted to carry a plurality of work blanks.

Another object of the invention is the provision of a novel automatic metal working machine of the chucking type comprising automatic blank feeding or chucking mechanisms for periodically feeding or positioning blanks in the machine.

Another object of the invention is the provision of a novel automatic metal working machine of the multiple work spindle, indexable work spindle turret type of chucking machine comprising automatic mechanical blank feeding or chucking mechanism for periodically feeding blanks to the work spindle in the loading station.

The invention resides in certain novel features and details of construction and combinations and arrangements of parts, and further objects and advantages thereof will be apparent to those skilled in the art to which it pertains, from the following description of the preferred embodiment thereof described with reference to the accompanying drawings, in which Fig. 1 is a perspective of an automatic metal working machine embodying the present invention;

Fig. 2 is a section taken approximately on the line 2—2 of Fig. 3;

Fig. 3 is a top plan view of the machine shown in Fig. 1, with portions broken away and in section, and Fig. 4 is a section through the lower sprocket wheels of the conveyor.

Similar reference characters designate corresponding parts throughout the several views of the drawings.

The invention is particularly applicable to and is therefore described and illustrated as embodied in a four spindle, indexable work spindle turret type of "Cleveland Automatic" chuck machine, and only those parts of the machine which are necessary to a clear understanding of the invention are illustrated and described. The remainder of the machine is old and well known in the art and may be found embodied in a plurality of different structures.

Referring to the drawings, a plurality of work spindles B, in the present instance four, are rotatably supported in longitudinal apertures in a work spindle turret 10 rotatably supported in the spindle head 11 of the frame of the machine designated in general by the reference character A, equally spaced about the axis of rotation of the turret. The spindles B are identical in construction and comprise a spindle tube 14 rotatably supported by suitable bearings provided with means for taking up wear, etc. The spindle tube 14 is similar to that illustrated in U. S. Patent No. 1,950,931 and is rotatably supported in the turret and driven from the main drive shaft 15 of the machine in a similar manner.

The front end of the spindle tube 14 is provided with a collet chuck 16 of conventional construction slidably supported therein. Work engaging surfaces 17 of the spring fingers 18 are formed to accommodate the contour or shape of the particular piece of work being operated on, which, in the embodiment illustrated, is a tappet valve W. The collet chuck 16 is of the "push-out" type and the exterior surfaces of the fingers 18 are tapered and cooperate with a tapered or frusto-conical surface on the interior of the spindle head 20, supported on the front end of the spindle tube 16 through the medium of an adapter member 21, to close the chuck upon movement thereof towards the front end of the spindle. Movement of the chuck 16 towards the front is effected through the medium of a chuck tube 22, the front end of which abuts the rear end of the chuck. Upon movement of the chuck tube 22 towards the rear, the chuck 16 is free to slide towards the rear of the spindle and releases automatically. The construction of the chuck tube 22 and the operating mechanism therefor, including chuck fingers 25 pivotally supported in a finger block 26 slidably supported on the spindle tube 14, and the chuck thimble 27 provided with an annular groove also slidably supported on the spindle tube 14 is the same as that illustrated in the aforesaid patent and operates in a similar manner.

The chuck thimble 27 is actuated in predetermined timed relation to the other operations of the machine to open and close the chuck, as desired, by a member 30 slidably supported on parallel rods 31, and provided with a shoe member 32 adapted to engage within the annular groove 28 of the spindle thimble in the loading station, which in the machine illustrated is the front lower station. The member 30 is actuated by and under the control of a cam 34 fixed to an auxiliary cam shaft 35 driven from the main cam shaft 36 in any conventional manner. Upon the opening of the chuck 16 in the loading station, the work is ejected therefrom by an ejector member 38 attached to the front end of an ejector tube 39 slidably supported within the chuck tube 22. The rear end of the ejector tube 39 is provided with a head 40 having an annular groove 41 within which a shoe member 42 carried by a member 44 slidably supported on the rods 31 is adapted to engage when in the loading station. The reciprocation of the member 44 in predetermined timed relation to the other operations of the machine is actuated by and under the control of a cam 47 fixed to the auxiliary cam shaft 35.

The spindle turret 10 is periodically indexed to successively move the spindles B through the various stations, including the loading station, from the auxiliary cam shaft 35 by mechanism well known in the art. The machine illustrated is provided with a main tool slide 50 supported in the head 51, a rear tool slide 52 supported on suitable ways formed on the frame A, and a vertical slide 53 supported by a head slide bracket 54 fixed to the spindle head 11. The tools for performing the various operations on the work blanks are carried by the slides just referred to which are of conventional construction and are operated in a manner well known in the art. A detailed description of the tools, slides, and operating mechanism therefore is considered unnecessary.

A magazine and chucking mechanism designated in general by the reference character C is provided for the purpose of automatically feeding work blanks to the spindles in the loading station. The magazine C comprises an endless chain conveyor 60 supported on a plurality of sprocket wheels 61, 62, 63 and 64 keyed to shafts 66 and 67 rotatably supported in opposite ends of a frame member 68. The frame member 68 is pivotally supported on a shaft 70 fixed in a bracket 71 slidably supported on a member 72 bolted or otherwise secured to the frame A. Alternate links of the endless chain conveyor 60 are provided with spring clip members 75 adapted to support work blanks W, in the present instance poppet valves. The work blanks are manually inserted in the spring clip members 75 at the top or outer end of the magazine. The conveyor C is reciprocated in predetermined timed relation to the other operations of the machine, including the actuation of the chuck in the loading station by means of a cam drum 77 keyed to the main cam shaft 36 through the medium of a bell crank lever 78 pivotally supported by a rearwardly projecting horn 79 on frame A. The bell crank lever 78 is operatively connected to the member 71 by a rod 80 pivotally connected, between the ways on member 72, to a downwardly extending post 83 on the member 71. Upon each reciprocation of the member 71, the magazine is moved bodily toward and from the spindle turret and the conveyor is advanced, by mechanism hereinafter referred to, a predetermined distance in a clockwise direction as viewed in Figs. 1 and 2.

When the magazine C is in its forward position, that is, the position illustrated in the drawings, the lower work blank W' is in axial alignment with the spindle in the loading station. With the parts in this position, a tubular shaft 85 slidably supported by the tool slide 50 and actuated from the main cam shaft 36 is advanced to push the blank W' into the chuck 16 between the spring fingers 18 thereof. The end of the blank W' is engaged by a member 86 slidably supported in a tubular member 87 fixed within the front end of the shaft 85, and a compression spring 88 is interposed between the members 86 and 87 to compensate for variations in the length of different blanks and for movement of the blank upon actuation of the spindle chuck. While the work blank W' is supported by both the collet fingers 18 and the member 86, the magazine C is withdrawn to its rear position and the blank W' released from the spring clip shaft 75. The member 85 is reciprocated to withdraw the member 86 from engagement with the blank W', after the chuck collet 16 has been closed and the magazine withdrawn. The shaft 85 is reciprocated in predetermined timed relation to the other operations of the machine by a lever 97 pivotally connected intermediate its ends to the frame A. The forward end of the lever 97 is forked and projects to either side of the shaft 85 between adjustable stops secured thereto. The rear end of the lever extends underneath the cam drum 98 and is provided with the cam roller which engages in the cam track 99.

The forward position of the magazine C and in turn the lower work blank W' can be adjusted by varying the length of the rod 80. The vertical position of the front end of the conveyor 60 and in turn the work blank W', can be adjusted to bring the work blank W' into axial alignment with the spindle in the loading station by rotating the frame member 68 about the shaft 70 by means of adjusting screws 90 and 91 threaded into projections 92 and 93, respectively, on the bracket 71, which engage projections 94 and 95, respectively, on the frame member 68 and are locked in any adjusted position by nuts 96.

Upon each rearward reciprocation of the magazine C the endless chain conveyor 60 is advanced a predetermined distance by the engagement of a lever arm 100, pivotally supported on an eccentric pin 101 adjustably secured in a bracket 102 bolted or otherwise secured to the spindle head 11, with one of a plurality of pins 103 fixed in the enlarged hub 104 of the sprocket wheel 64. The operation is similar to that of a pawl and ratchet. The conveyor is advanced in steps a distance equal to the distance between adjacent blanks W or adjacent spring clip members 75. In setting up the machine etc., the amount of advance imparted to the conveyor may be adjusted by means of the eccentric pin 101 which is secured in any adjusted position by the nut 105. In some instances the transverse reciprocation of the magazine C may be omitted, and the conveyor merely advanced in some convenient manner to bring the successive work blanks into alignment with the spindles in the loading station. A guide bar 106 supported by the conveyor frame 68 facilitates loading the conveyor and limits the movement or the position of the blanks W therein.

The operation of the machine is as follows: With the parts in the position shown in the drawings, the tools are withdrawn and the spindle in the loading station is in the midst of being loaded, and the member 85 is advancing to push the work blank W' into the chuck fingers 18. Immediately upon the completion of this operation, the chuck is actuated to grip the work blank and the magazine is withdrawn to its rear position. As the rearward movement of the magazine commences, the spring clip members 75 release the shank of the valve W', and continued movement of the magazine causes the lever 100, through the medium of the pins 103, to advance the endless chain conveyor 60 an amount equal to the distance between adjacent work blanks so that a new blank will be in axial alignment with the spindle in the loading station upon the next reciprocation of the magazine. As soon as the work blank W' has been released by the spring clip member 75, the member 85 is reciprocated in a reverse direction to withdraw the member 86 from engagement with the blank. Concurrently with and/or after the withdrawal of the magazine and the members 85 and 86, the tools are advanced to perform the necessary operations on the work. In some instances it will be apparent that some tools may be operating in one or more of the stations during the loading or chucking operation. After the desired operations have been performed, the tools are withdrawn and the turret 10 indexed to bring the next succeeding spindle into the loading position, after which the member 30 is actuated to open the chuck, and the member 44 actuated to eject the finished blank therefrom. The magazine C is then advanced to its forward position to bring the next succeeding work blank into axial alignment with the spindle and the cycle of operations just described repeated.

From the foregoing description of the preferred embodiment of the invention, it will be apparent that the objects of the invention have been attained and that a new and improved magazine and chucking mechanism, and machine, has been produced. While the invention has been illustrated and described with reference to the preferred embodiment thereof, I do not intend to be limited to the particular construction illustrated and described which may be varied within the scope of this invention. This application is intended to cover all variations, adaptations, and uses thereof that come within the knowledge and customary practice of those skilled in the art, and I particularly point out and claim as my invention the following.

I claim:
1. A chucking machine of the character referred to, comprising a rotatable work carrying spindle, an endless belt conveyor supported adjacent said spindle adapted to support a plurality of work blanks, means for periodically moving said conveyor whereby the work blanks are successively brought into axial alignment with said spindle, and means for transferring the work blank in alignment with said spindle from said conveyor to said chuck.

2. A chucking machine of the character referred to, comprising a frame, a spindle rotatably supported by said frame, a chuck carried by said spindle, a magazine comprising an endless belt conveyor supported by said frame adjacent the chuck end of said spindle, means on said conveyor for supporting a plurality of work blanks, means for reciprocating said magazine and advancing said conveyor whereby the work blanks supported thereon are successively brought into axial alignment with said spindle, and means for transferring work blanks to said chuck when in axial alignment with said spindle.

3. A chucking machine of the character referred to, comprising a frame, a spindle rotatably supported by said frame, a bracket supported by said frame, a member pivotally supported by said bracket, means for adjusting said member about its pivotal support, an endless conveyor supported by said member, means on said conveyor for supporting a plurality of work blanks, means for advancing said conveyor whereby the work blanks supported thereon are successively brought into axial alignment with said spindle, and means for transferring work blanks to said chuck when in axial alignment with said spindle.

4. A chucking machine of the character referred to, comprising a frame, a spindle rotatably supported by said frame, a bracket slidably supported by said frame, a member pivotally supported by said bracket, means for adjusting said member about its pivotal support, an endless conveyor supported by said member, means on said conveyor for supporting a plurality of work blanks, pawl and ratchet means for advancing said conveyor, means for reciprocating said member whereby the work blanks supported by said conveyor are successively brought into axial alignment with said spindle, and means for transferring the work blanks to said chuck when in axial alignment with said spindle.

5. A chucking machine of the character referred to, comprising a frame, a turret rotatably supported by said frame, a plurality of spindles rotatably supported by said turret, means for periodically indexing said turret whereby said spindles are successively indexed through a loading station, an endless belt conveyor supported adjacent said loading station, means on said conveyor for supporting a plurality of work blanks, and means for transferring work blanks from said conveyor to the spindles in the loading station.

6. A chucking machine of the character referred to, comprising a frame, a turret rotatably supported by said frame, a plurality of spindles rotatably supported by said turret, means for periodically indexing said turret whereby said spindles are indexed through a plurality of stations one of which is a loading station, an endless belt conveyor supported by said frame adjacent said loading station, means on said conveyor for supporting a plurality of work blanks, means for advancing said conveyor whereby the work blanks are successively brought into axial alignment with the spindles in the loading station, and means for successively transferring blanks from said conveyor to the spindles in the loading station.

7. In a machine of the character described the combination of a frame, a turret rotatably supported by said frame, a plurality of work spindles rotatably supported by said turret, each of said work spindles comprising a work holding chuck, means for periodically indexing said turret whereby said spindles are successively indexed through a plurality of stations one of which is a loading station, means for actuating said chucks in said loading station, an endless belt conveyor supported by said frame, means on said conveyor for supporting a plurality of work blanks in predetermined spaced relationship with one of said blanks in axial alignment with the spindle in the loading station, means for periodically advancing said conveyor a predetermined distance whereby the work blanks are successively brought into axial alignment with the spindles in the loading station, and means for successively transferring blanks from said conveyor to said spindle chucks in the loading station.

8. A chucking machine of the character referred to, comprising a frame, a turret rotatably supported by said frame, a plurality of spindles rotatably supported by said turret, means for periodically indexing said turret whereby said spindles are indexed through a plurality of stations one of which is the loading station, a magazine comprising an endless conveyor supported by said frame adjacent said loading station, means on said conveyor for supporting a plurality of work blanks, means for reciprocating said magazine and advancing said conveyor whereby the work blanks are successively brought into axial alignment with the spindle in the loading station, and means for successively transferring the work blanks from said conveyor to the spindle in the loading station.

9. A chucking machine of the character referred to, comprising a frame, a turret rotatably supported by said frame, a plurality of spindles rotatably supported by said turret, means for periodically indexing said turret whereby said spindles are indexed through a plurality of stations one of which is the loading station, a magazine comprising an endless conveyor supported by said frame adjacent said loading station, means on said conveyor for supporting a plurality of work blanks, a pawl and ratchet mechanism for advancing said conveyor, means for reciprocating said magazine whereby the work blanks are brought into axial alignment with the spindles in the loading station, and means for successively transferring blanks from said conveyor to the spindles in the loading station.

10. In a machine of the character described the combination of a frame, a turret rotatably supported by said frame, a plurality of work spindles rotatably supported by said turret, means for periodically indexing said turret whereby said spindles are successively indexed through a plurality of stations one of which is a loading station, a bracket slidably supported by said frame, a member pivotally supported by said bracket, means for adjusting said member about its pivotal support, an endless conveyor supported by said member, means on said conveyor for supporting a plurality of work blanks in predetermined spaced relationship, pawl and ratchet mechanism for advancing said conveyor, means for reciprocating said bracket whereby the blanks are successively brought into axial alignment with the spindles in the loading station, and means for transferring blanks from said conveyor to said spindles in the loading station.

HARRY W. RUPPLE.